US010430982B2

(12) United States Patent
Nolan et al.

(10) Patent No.: US 10,430,982 B2
(45) Date of Patent: Oct. 1, 2019

(54) SENSOR DATA VISUALIZATION APPARATUS AND METHOD

(71) Applicant: Intel Corporation, Santa Clara, CA (US)

(72) Inventors: Keith Nolan, Mullingar (IE); Mark Kelly, Leixlip (IE); Hugh M. Carr, Delgany (IE); Philip Wade, Millingar (IE); Charlie Sheridan, Ballivor (IE); Brian L. McCarson, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 541 days.

(21) Appl. No.: 14/664,603

(22) Filed: Mar. 20, 2015

(65) Prior Publication Data

US 2016/0275706 A1 Sep. 22, 2016

(51) Int. Cl.
| | |
|---|---|
| G06T 11/20 | (2006.01) |
| G06T 11/60 | (2006.01) |
| G06T 11/00 | (2006.01) |
| G06T 17/05 | (2011.01) |
| G08B 21/18 | (2006.01) |
| G08B 19/00 | (2006.01) |

(52) U.S. Cl.
CPC .......... *G06T 11/206* (2013.01); *G06T 11/001* (2013.01); *G06T 17/05* (2013.01); *G08B 19/00* (2013.01)

(58) Field of Classification Search
None
See application file for complete search history.

(56) References Cited

U.S. PATENT DOCUMENTS

| 8,160,838 B2 * | 4/2012 | Ramin ................ F24F 13/0209 455/66.1 |
| 2009/0095054 A1 | 4/2009 | Groves |
| 2012/0259594 A1 | 10/2012 | Khan et al. |
| 2014/0279574 A1 | 9/2014 | Gettings et al. |
| 2014/0379156 A1 * | 12/2014 | Kamel ..................... G05F 1/66 700/291 |

FOREIGN PATENT DOCUMENTS

| WO | WO 2013-158866 A1 | 10/2013 |
| WO | WO 2014-169066 A1 | 10/2014 |

OTHER PUBLICATIONS

International Search Report and Written Opinion dated Jun. 7, 2016 for International Application No. PCT/US2016/018338, 13 pages.
Extended European Search Report dated Oct. 23, 2018 for European Patent Application No. 16769227.6, 7 pages.
Carsten Buschmann et al., "SpyGlass: A Wireless Sensor Network Visualizer", Jan. 2005, 6 pages, vol. 2, No. 1.

* cited by examiner

*Primary Examiner* — Robert K Carpenter
(74) *Attorney, Agent, or Firm* — Schwabe, Williamson & Wyatt, P.C.

(57) ABSTRACT

In embodiments, apparatuses, methods and storage media (transitory and non-transitory) are described that receive a plurality of sensor data values and a plurality of location data values corresponding to the sensor data values, may generate interpolated data values for a surveyed area, and may generate an image corresponding to the surveyed area based at least in part on the sensor data values and the interpolated data values. Other embodiments may be described and/or claimed.

21 Claims, 8 Drawing Sheets

SENSOR DATA VISUALIZATION APPARATUS AND METHOD

TECHNICAL FIELD

The present disclosure relates to the field of data processing, in particular, to sensor data visualization apparatuses and methods.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Variations in environmental conditions such as temperature and humidity levels can occur across a surveyed area such as a large scale industrial facility. Existing methods of monitoring these variations may be limited in their ability to identify specific areas of concern, or may not be amenable to producing a relevant visualization output. Existing methods may not provide an adequate density of measurements at a working level of facility equipment, or may be designed for spot measurements with output that is not readily amenable to creation of a comprehensive survey.

A basic premise of the Internet of Things (IoT) is that a variety of objects or things, such as sensors, actuators, location-based systems, and identification technologies may interact with each other using machine-to-machine communications, and may act in a cooperative fashion to achieve a common goal. An example might be a number of air quality sensors gathering information about air quality in a geographically dispersed location. A further example may be a series of piezo-electric vibration sensors monitoring equipment performance or monitoring home security. In this regard each sensing device could be considered an IoT device, and the cooperation of many devices working together could be considered an IoT service.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
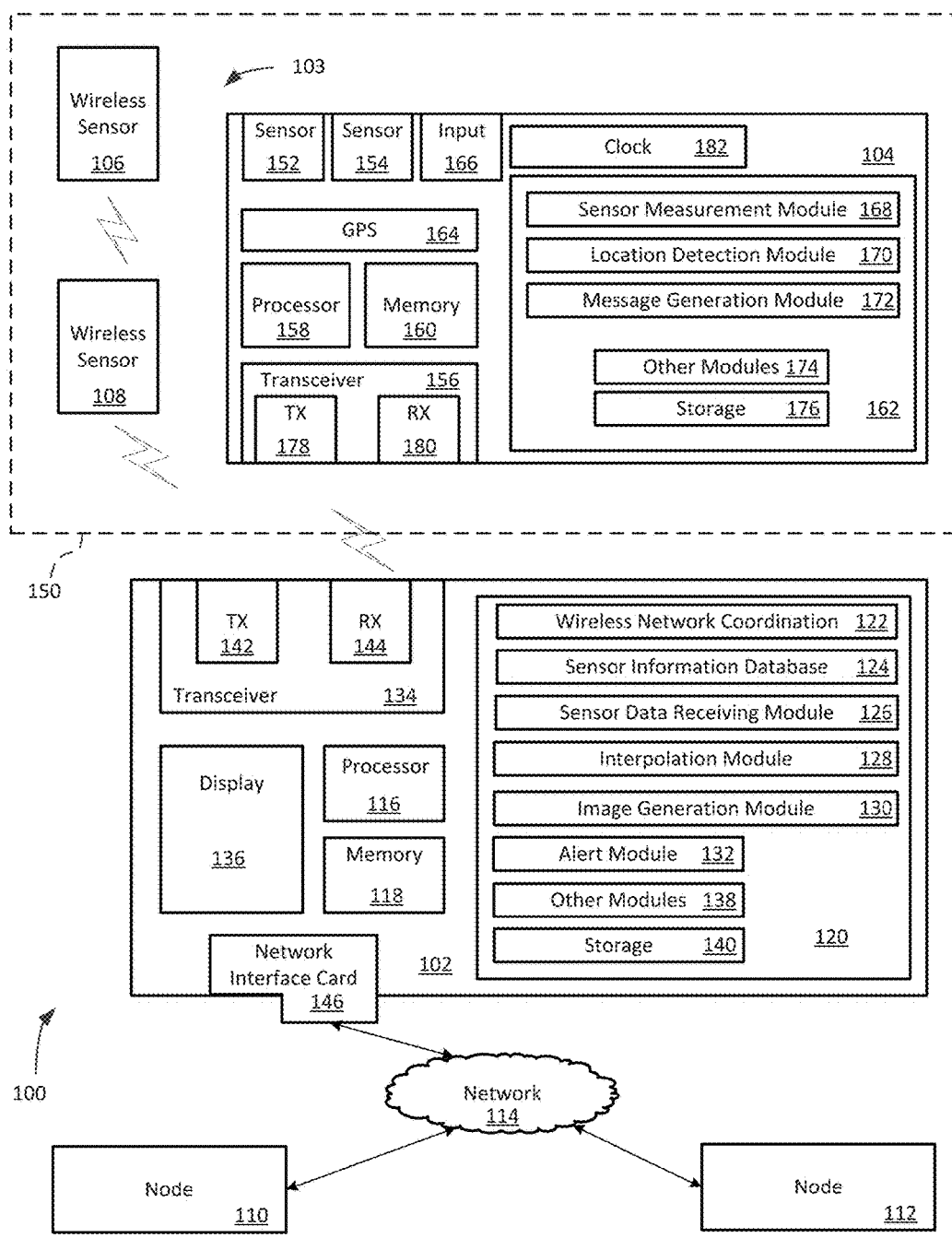
FIG. 1 is a block diagram of a network environment including a computing device having sensor data visualization technology of the present disclosure, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The term "module" may refer to software, firmware and/or circuitry that is/are configured to perform or cause the performance of one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may collectively or individually be embodied as circuitry that forms a part of a computing device. As used herein, the term "processor" may be a processor core.

Referring now to FIG. 1, a network environment 100, including a computing device 102 having sensor data visualization technology of the present disclosure, in accordance with various embodiments, is illustrated. In embodiments, the computing device 102 may be in wireless data communication with a wireless sensor network 103 including one or more wireless sensor devices 104, 106, 108. The computing device 102 may also be in data communication with nodes 110, 112 over a network 114, in various embodiments. As shown, computing device 102 may include a number of components 116-146, including a processor 116, a system memory 118, an execution environment 120, a wireless network coordination module 122, a sensor information database 124, a sensor data receiving module 126, an interpolation module 128, an image generation module 130, an alert module 132, a transceiver 134, and a display 136 that may be coupled together and configured to cooperate with each other to generate a visual map, such as a heatmap, on the display 136 based at least in part on sensor information from one or more of the wireless sensor devices 104, 106, 108. In embodiments, the image generation module 130 may be referred to as an image generator. In embodiments, the image generation module 130 may be operated by the processor 116 to generate an image that depicts variations in a measured quantity using a color spectrum (e.g., blue for cold and red for hot, in the case of a heatmap). Higher sensed values may be assigned a color closer to a first end of the color spectrum than lower values, for example. In embodiments, the execution environment 120 may also include other modules 138 and storage 140, the transceiver 134 may include a transmitting component 142 and a receiving component 144, and the computing device 102 may include a network interface card 146. The other modules 138 may include a threshold comparison module in various embodiments to compare sensor data values or sensor location values to one or more predefined threshold values. In embodiments, one or more of the modules in the execution environment 120 may be within another module. In embodiments, the image generation module 130 or the alert module 132 may be in an action module, for example. The execution environment may also include an operating system operated by the processor 116. In embodiments, nodes 110 and 112 may be configured with some or all of the components described with respect to the computing device 102.

In embodiments, the wireless sensor network 103 may be located in a previously defined area, such as within a floorplan 150 of an environmentally controlled facility, for example. In embodiments, the environmentally controlled facility may be a datacenter or a test or manufacturing facility. The wireless sensor network 103 may also be extended into a broader environment such as a town, city, state, nation, or other scale in various embodiments. The wireless sensor network 103 may operate using one or more wireless network technologies or topologies. The wireless sensor network 103 may operate using wireless local area network (WLAN), cellular, or narrowband proprietary wireless technologies, for example. The wireless sensor network 103 may operate in a mesh, client-server, or other topology in various embodiments. The wireless sensor network 103 may be a mesh network where the base station acts as a network coordinator, or a WLAN where the base station may be an access point and the wireless sensor device may be a client device, for example. In embodiments, the wireless sensor devices in the wireless network 103 may be positioned at a common height above the ground, such as approximately 1.5 meters, that allows the wireless sensor devices to monitor sensed parameters at a working level height. The wireless sensor devices may be positioned at other heights in various embodiments, which may or may not be common heights.

In embodiments, the wireless sensor device 104 may include a first sensor 152, a second sensor 154, and a transceiver 156. The wireless sensor device 104 may have a different number of sensors in other embodiments. The first sensor 152 may be a temperature sensor and the second sensor 154 may be a humidity sensor, in embodiments. Other types of sensors may also be used such as vibration sensors or movement sensors (e.g., accelerometers or gyros); sound or noise sensors; electromagnetic radiation sensors; nuclear radiation sensors; water quality or pollutant sensors; air quality or pollutant (e.g., carbon monoxide, sulfur dioxide, particulates) sensors; and stock, water, or moisture level sensors. The wireless sensor device 104 may also include a processor 158, a memory 160, an execution environment 162, a geographic positioning system (GPS) 164, and an input device 166 in various embodiments. The execution environment 162 may include a sensor measurement module 168, a location detection module 170, a message generation module 172, other modules 174, and storage 176, in embodiments. The execution environment 162 may also include an operating system, such as an embedded operating system or a specific IoT operating system, operated by the processor 158 in various embodiments. The transceiver 156 may include a transmitter component 178 and a receiver component 180 in various embodiments. The sensor device 104 may also include a clock 182 in various embodiments.

In embodiments, the sensor measurement module 168 may be operated by the processor 158 to gather sensor data measurements from the first sensor 152 and the second sensor 154. The location detection module 170 may be operated by the processor 158 to record a location at the time the sensor data measurements are gathered. The message generation module 172 may be operated by the processor 158 to send a message across the wireless network 103 that may include sensor measurement data gathered by the sensor measurement module 168, location data detected by the location detection module 170, and timestamp information that may have been obtained from the clock 182 at the time the sensor measurement data was gathered and the location data was detected. Wireless sensor devices 106 and 108 may be configured in a similar manner to the wireless sensor device 104 in various embodiments. In embodiments, messages generated by the message generating module 172 may be received at a base station such as the computing device 102.

The wireless sensor devices 104, 106, 108 may be mobile, portable, or fixed. In a mobile or portable deployment, individual sensors may typically be moved to each survey point in order to cover an entire survey area. In a fixed-position deployment, the wireless sensor devices may be uniformly or non-uniformly distributed across the area to be surveyed in various embodiments. The sensor devices 104, 106, 108 may gather location-tagged sensor information that may be passed to a base station, access point, or mesh coordinator such as the computing device 102 operating the wireless network coordination module 122. In embodiments, the sensor devices 104, 106, 108 may operate at the same time and collect data in parallel.

The processor 116 may operate the wireless network coordination module 122 to communicate with the wireless network 103 with the transceiver 134 such that the computing device 102 may act as a base station, access point, or mesh coordinator for the wireless network 103 in various embodiments. In embodiments, the sensor data receiving module 126 may be operated by one or more processors such as the processor 116 to receive a plurality of sensor data values and a plurality of location data values corresponding to the plurality of sensor data values. The interpolation module 128 may be operated by one or more processors such as the processor 116 to generate a two dimensional matrix corresponding to a surveyed area based at least in part on the plurality of sensor data values and the plurality of location data values. In embodiments, the interpolation module 128 may be further operated by one or more processors to generate interpolated data values based at least in part on the two dimensional matrix. The image generation module 130, operated by one or more processors and acting as an image generator may generate an image corresponding to the surveyed area based at least in part on the plurality of sensor data values and interpolated data values in various embodiments.

Figure 2:
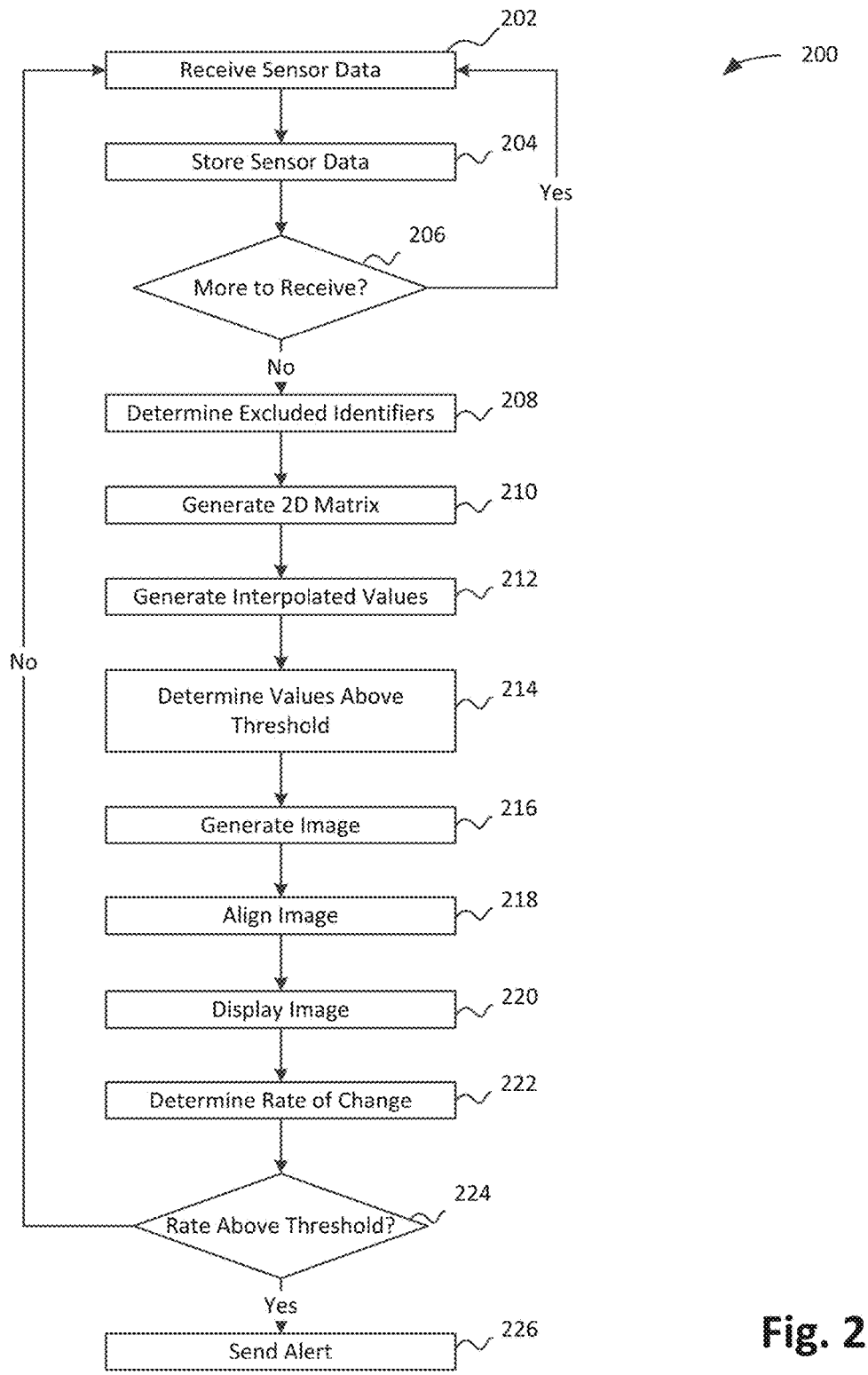
FIG. 2 is a flow diagram of an example process of generating an image that may be implemented on various computing devices described herein, in accordance with various embodiments.

FIG. 2 depicts an example process 200 for generating and displaying an image that may be implemented by the computing device 102 in accordance with various embodiments. In various embodiments, the process 200 may be performed by the sensor data receiving module 126, the interpolation module 128, the image generation module 130, and the alert module 132. In other embodiments, the process 200 may be performed with more or less modules and/or with some operations in different order.

As shown, for embodiments, the process 200 may start at a block 202 where sensor data may be received. Sensor data from one or more of the sensor devices 104, 106, 108 in the sensor network 103 may be received at the transceiver 134 of the computing device 102, for example. The sensor data may include sensor measurement data, such as data corresponding to a temperature or humidity measurement, and may also include sensor location data, in various embodiments. In embodiments, the sensor data may also include sensor identification data that may include a sensor identifier corresponding to the sensor that collected the sensor measurement data. For example, a sensor identifier of S104 may correspond to the sensor device 104 and a sensor identifier of S106 may correspond to the sensor device 106. The sensor location data may include latitude, longitude, and elevation information, such as from the GPS 164, or may include other location information, such as a fixed sensor device location, or a sampling location entered into the input device 166, for example. The sensor data may also include timestamp information corresponding to the time the sensor measurement was made. The timestamp information may be generated by the clock 182, for example.

In embodiments, sensor offsets may be calculated before wireless sensor devices such as the wireless sensor device 104 are deployed in a wireless sensor network such as the wireless sensor network 103. The sensor offsets may be calculated by operating the wireless sensor device in a controlled environment with known sensed parameters, such as known temperature and humidity levels. One or more sensor offsets may be associated with a wireless sensor device identifier so that when a grid is populated with sensor data, it can be populated with adjusted sensor data to account for the calculated sensor offset. For example, if the first sensor 152 indicated a temperature of two degrees lower than the known temperature and the second sensor 154 indicated a relative humidity level five percent higher than the known relative humidity level, a first offset of +2 degrees and a second offset of −5 percent may be associated with the sensor identifier S104. In some embodiments, each sensor in the wireless sensor device may be assigned its own identifier, in which case the offsets would be assigned to the identifier corresponding to the appropriate sensor.

At a block 204, the sensor data may be stored, such as in the sensor information database 124, for example. In embodiments, the corrected sensor data may be stored by applying a calculated offset associated with the sensor before storing the measured data. At a decision block 206, it may be determined whether there is additional sensor data to receive. If there is additional sensor data to receive, the process 200 may return to the block 202 where additional sensor data is received and stored at the block 204. If there is not additional sensor data to receive, the process 200 may proceed to a block 208, where it may be determined whether any sensor identifiers should be excluded from further processing. The process 200 may also proceed from the decision block 206 to the block 208 if it is determined that remaining sensors have malfunctioned and are not able to transmit their sensor information, such as may occur if a predefined period of time has passed since receiving any communication from a particular sensor, in various embodiments. At the block 208, some sensor identifiers may be excluded if one or more sensor data values corresponding to the sensor identifier are determined to be outside of an acceptable range. For example, for a temperature sensor, if the sensor measurement data indicated a temperature of 4000 degrees Fahrenheit and the expected range is 35 to 100 degrees Fahrenheit, the sensor identifier associated with the spurious measurement may be flagged so that sensor data from the flagged sensor device are not used in further processing.

At a block 210, a data structure, such as a two dimensional (2D) sparse matrix, may be generated based at least in part on the received sensor data. In embodiments, a uniformly distributed grid matrix may be constructed and populated with data based at least in part on the sensor measurement data and the sensor location data. In embodiments, not all of the grid location points in the grid matrix may have data, resulting in a sparsely populated grid such that a 2D sparse matrix is created. Other data structures, that may be sparsely populated data structures, may be constructed in various embodiments. In embodiments, sensor data associated with excluded sensor identifiers may not be included in the data structure (e.g., the 2D sparse matrix). In embodiments, if corrected sensor data was not stored in the sensor information database, calculated offsets may be applied to the data before populating the data structure (e.g., the 2D sparse matrix). At a block 212, interpolated values may be generated to add values to the data structure (e.g., the 2D sparse matrix) to give a sensor data structure. In embodiments, the interpolated values may be generated using one or more interpolation techniques such as linear, nearest neighbor, cubic, or spline, for example. In embodiments, the interpolated values may be generated based at least in part on the sensor measurement data and the sensor location data that were included in a sparse data structure such as a 2D sparse matrix. In embodiments, the resulting sensor data structure may include sensor measurement data values and interpolated data values. The sensor data structure may correspond to a surveyed area such that sensor data visualization imagery may be generated based at least in part on the sensor data structure, including interpolated data values, that may give a more fine grained view of one or more sensed parameters, in various embodiments, than generating visualization imagery without using interpolated values. At a block 214, it may be determined whether values in the sensor data structure are above a predetermined or predefined threshold. In embodiments, it may be determined whether values in the sensor data structure are above a received threshold value. For example, a user may be prompted for a threshold value that may be input by the user and used at the block 214. For sensor data values corresponding to temperature, the threshold value may define a minimum temperature required before imagery corresponding to the values may be displayed, for example. At a block 216, an image may be generated based at least in part on the sensor data structure. In embodiments, the image may also be generated based at least in part on the values determined to be above the threshold. At a block 218, the image may be aligned with a map of a surveyed area. At a block 220, the image may be displayed. In embodiments, the image may be displayed overlaid on the map of the surveyed area.

In embodiments, a rate of change may be determined at a block 222. At a decision block 224, it may be determined whether the rate of change is above a predetermined or predefined threshold. For example, it may be determined whether a relative humidity level has risen more than 10 percent at any of the surveyed locations since the last measurement, or in a predetermined period of time, such as the last hour. If, at the decision block 224, it is determined the rate of change is above the predetermined or predefined threshold, an alert may be sent at a block 226. For example, a text message or email may be sent to a site supervisor in various embodiments that includes the current measured value, rate of change, and location of any values that exceed the predetermined or predefined threshold. In embodiments, the alert may include a recommendation to alter an activation state or location of an environmental control such as a fan or duct. If the rate is determined to not be above the threshold, the process 200 may return to the block 202 where additional sensor data may be received in various embodiments. In embodiments, rather than determining whether a rate of change is above a predetermined or predefined threshold, it may be determined whether a measured data value is above or below a predetermined or predefined threshold at the decision block 224, with the alert being sent based at least in part on that determination. For example, it may be determined whether the temperature in any part of the surveyed area is above 103 degrees Fahrenheit, and an alert may be sent, including the temperature and location of any values that exceed the specified temperature. The process 200 may also return to the block 202 where additional sensor data may be received after sending the alert at the block 226 in various embodiments.

In embodiments, sensor measurement data, location data, and timestamp data may be received and stored at the blocks 202 and 204 over multiple iterations of the process 200 so additional analyses may be performed by the computing device 102. In embodiments, continuous monitoring may occur over a period of time to identify areas of concern and assess the impact of variable production workloads or facility heat management systems, for example. In embodiments, analytical analyses such as optimal range calculation, threshold breech detection, rate of change analysis, or trend prediction may be performed. In embodiments, trends of historical sensor measurements may be projected forward in time to give projected value estimates at a future point in time. In embodiments, images may be displayed for previous time periods, or may be displayed in succession such that an effect similar to that of a video representation of the image over time may be displayed. In embodiments, the image may be updated on a near real-time basis. In various embodiments, rather than determining whether values in the sensor data structure are above a threshold value and performing actions based on that determination, it may be determined whether values in the sensor data structure are below a threshold value or equal to a threshold value, and performing actions based at least in part on that determination. In embodiments, the wireless sensor devices may provide sensor data values and location data values such that interpolated values may not be generated and an image may be generated and displayed or an alert may be sent based at least in part on the sensor data values and location data values without using interpolated values.

Figure 3:
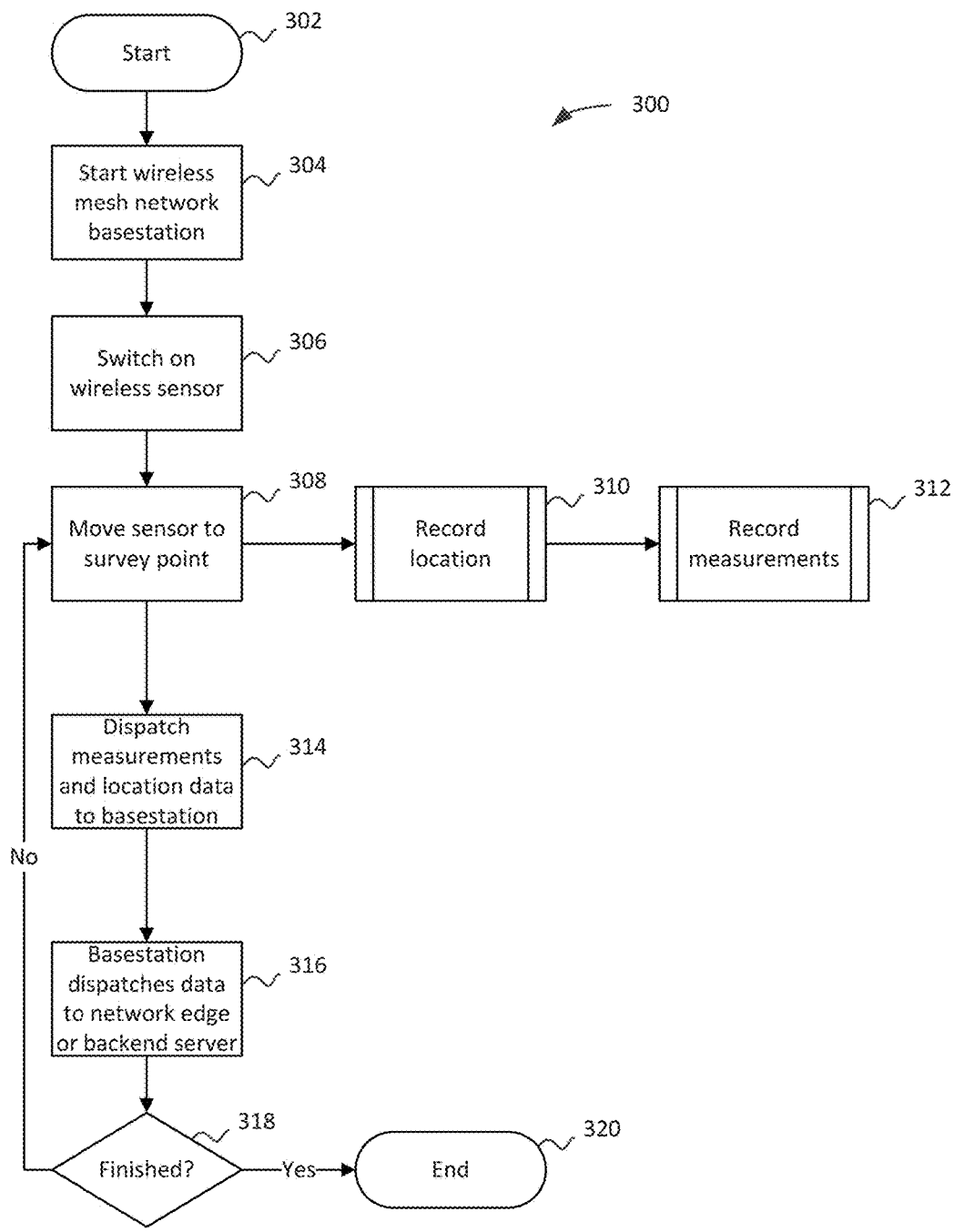
FIG. 3 is a flow diagram of an example process of capturing sensor measurements and recording survey locations that may be implemented on various computing devices described herein, in accordance with various embodiments.

FIG. 3 is a flow diagram of an example process 300 for capturing sensor measurements and recording survey locations with a mobile wireless sensor device that may be implemented on various computing devices described herein, in accordance with various embodiments. The process 300 may start at a block 302. At a block 304, a wireless mesh network base station may be started. In embodiments, starting the wireless mesh network base station may include operating the wireless network coordination module 122, for example. At a block 306, a wireless sensor may be switched on. In embodiments, this may include switching the wireless sensor device 104 on. More than one wireless sensor device may be switched on in various embodiments.

At a block 308, the sensor may be moved to a survey point. In embodiments, more than one sensor may be moved to a plurality of survey points at the block 308. In embodiments, the sensor may be moved to a survey point by an automated process, such as by a robot. In other embodiments, the sensor may be a part of an autonomous vehicle. In embodiments, the sensor may be moved to the survey point by a person. In various embodiments, more than one sensor in fixed locations may be used rather than one or mobile sensors that collect sensor data at more than one survey location. Accordingly, if only fixed-location sensor devices are used, the process 300 may not include moving the sensor device at the block 308 in some embodiments. In various embodiments, a mix of both fixed location and mobile sensor devices may be used.

At the survey point, a location may be recorded at a block 310 and measurements may be recorded at a block 312. The location may be automatically calculated by the wireless sensor device as an X/Y location relative to a known data point, may be obtained from location sensing hardware such as the GPS 164, or may be manually recorded at an input such as input 166 of the wireless sensor device in various embodiments. The location may also be based at least in part on elevation information (e.g., a height of a sensor device), in embodiments. At a block 314, the measurements and location data may be dispatched to the base station. At a block 316, the base station may dispatch the data to a network edge or a backend server. In embodiments, the base station may also include data storage and image generation capability such as described with respect to the computing device 102. In such embodiments, the base station may retain the measurement and location data rather than dispatching it to another computing device. At a decision block 318, it may be determined whether the sensor data gathering process is finished. If the process is not finished, the process 300 may return to the block 308 where the sensor may be moved to a new survey point where additional location and measurement data may be recorded at the blocks 310 and 312 followed by dispatching the data to the base station at the block 314. The data may be dispatched to the computing device 102 acting as a base station, for example. If it is determined the sensor data gathering process is finished at the decision block 318, the process 300 may end at a block 320. In embodiments, the sensor data may be stored on the sensor device such as in the memory 160 and dispatched to the base station after data has been collected from all survey points rather than dispatching the data as it is collected after each survey point.

Figure 4:
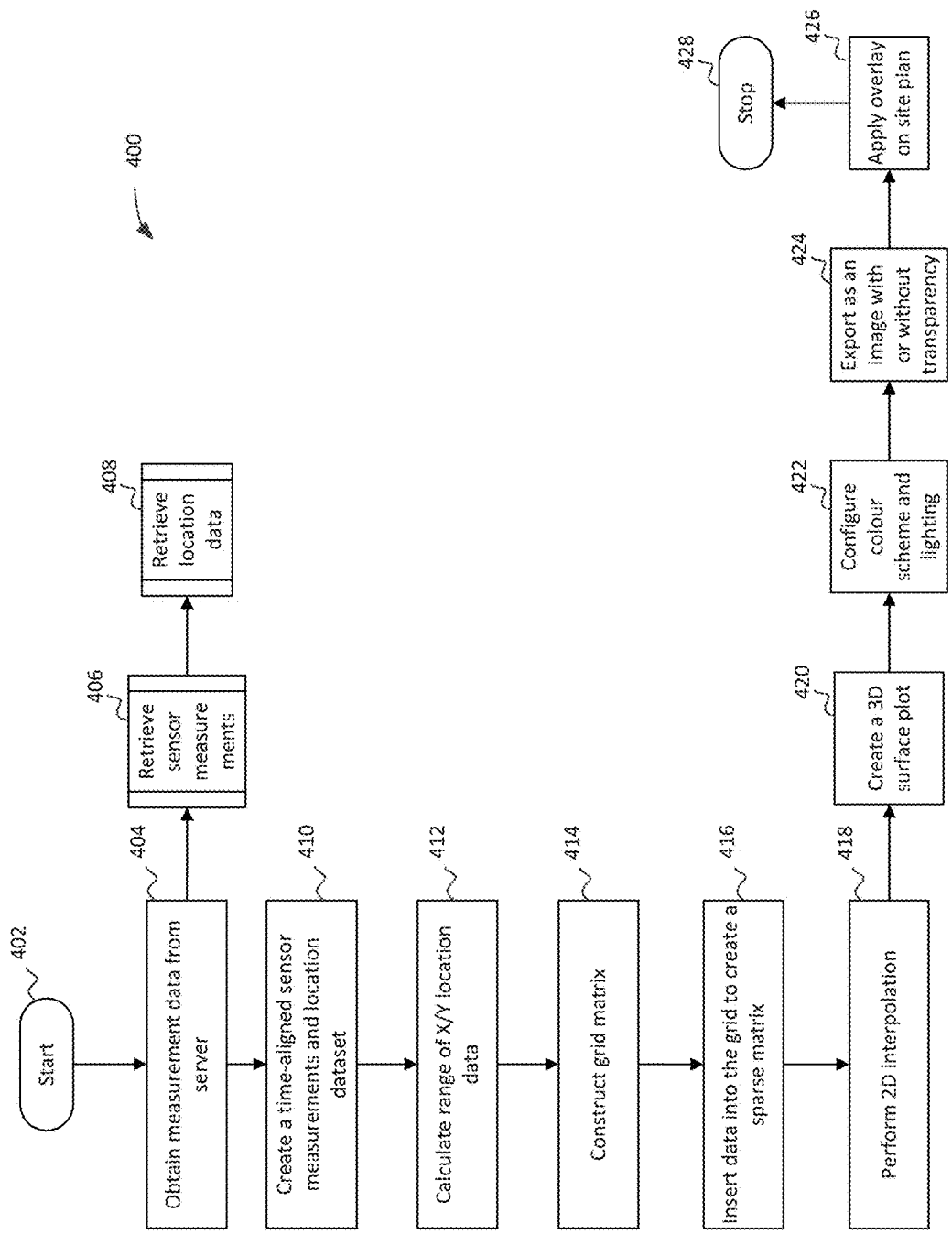
FIG. 4 is a flow diagram of another example process of generating an image that may be implemented on various computing devices described herein, in accordance with various embodiments.

FIG. 4 is a flow diagram of another example process 400 of generating an image that may be implemented on various computing devices described herein, in accordance with various embodiments. The process 400 may start at a block 402. At a block 404, measurement data may be obtained from a server. This may occur if the collected sensor data was stored in a base station but may be processed in another computing device such as one of the nodes 110, 112, for example. In embodiments, the computing device 102 may function as a base station, but image generation may occur on another computing device configured in a similar manner to that described with respect to the interpolation module 128 and image generation module 130 of the computing device 102. In embodiments, the measurement data may have been stored in the sensor information database 124 and may not be obtained from a server, but may be obtained on the same computing device, such as the computing device 102, for example. Obtaining the measurement data may include retrieving sensor measurements at a block 406 and retrieving location data at a block 408 along with corresponding timestamp data in various embodiments.

At a block 410, a time-aligned sensor measurements and location dataset may be created. In embodiments, the location data and sensor measurement data may have been stored as separate lists with timestamps associated with each entry. Creating a single time-aligned sensor measurements and location dataset may occur in such embodiments. At a block 412, a range of X/Y location data may be calculated. In embodiments, the range of X/Y location data may be predefined to occur at the boundaries of a map of a site plan. In embodiments, the range of X/Y location data may be calculated as a minimum and a maximum of the X and Y values that occur in the dataset. At a block 414, a grid matrix may be constructed. The grid matrix may be constructed based at least in part on the range of X/Y location data. In embodiments, the grid matrix may be a uniformly distributed grid matrix. At a block 416, sensor measurement data may be inserted into the grid matrix at coordinates corresponding to location data associated with each measurement. In embodiments, not all of the grid location points may have data, resulting in a sparsely populated grid such that a sparse matrix is created.

At a block 418, two-dimensional interpolation in the X and Y dimensions may be performed to populate the unfilled grid locations. The interpolation may be performed using linear, nearest neighbor, cubic, or spline techniques, for example. At a block 420, a three-dimensional surface plot may be created. In embodiments, a height, or Z dimension, of the surface plot may correspond to a magnitude of the measured data. At a block 422, a color scheme and lighting may be configured. In embodiments, the color scheme may include depicting variations in the measured data using a color spectrum (e.g., blue for cold and red for hot). At a block 424, an image may be exported. In embodiments, the image may be exported with transparency. In other embodiments, the image may be exported without transparency. At a block 426, the exported image may be overlaid on a site plan in various embodiments. In embodiments, the image may be displayed without being overlaid on a site plan. The process 400 may end at a block 428.

Figure 5:
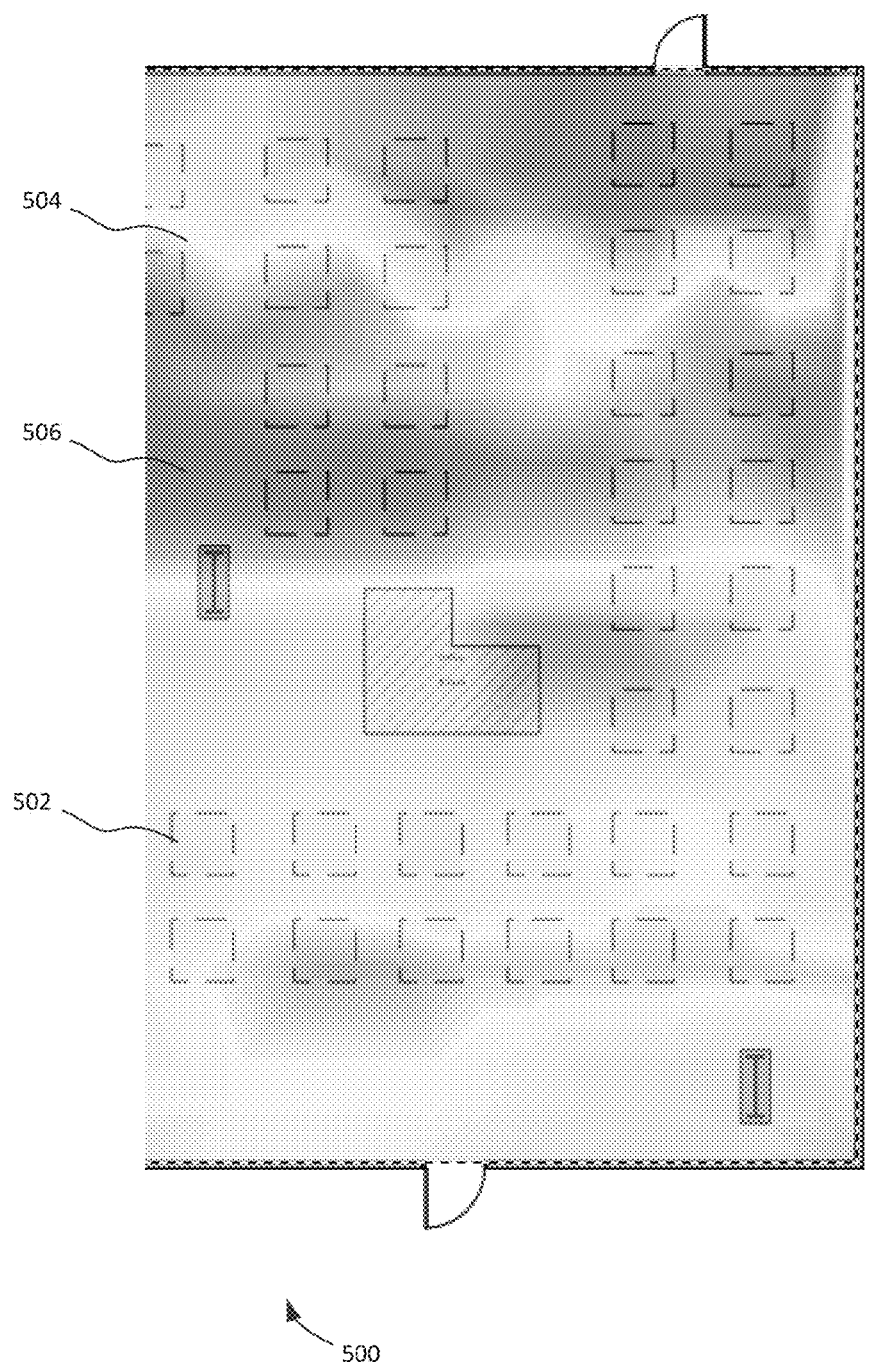
FIG. 5 illustrates an example temperature survey heatmap overlaid on a map of a floor plan, in accordance with various embodiments.

FIG. 5 illustrates an example temperature survey heatmap 500 overlaid on a map of a floor plan, in accordance with various embodiments. Although the heatmap 500 is shown in grayscale, the heatmap 500 may be generated and displayed such that variations in a measured quantity are depicted using a color spectrum (e.g., blue for cold and red for hot). The heatmap 500 may be generated by the computing device 102 as described with respect to the block 216 of FIG. 2 or the block 426 of FIG. 4 in various embodiments, for example. Although the heatmap 500 is shown overlaid on a floorplan, the heatmap 500 may be displayed, in embodiments, without being overlaid on a floorplan. In embodiments, the heatmap may be overlaid on a map corresponding to the floorplan 150. Various types of equipment present in an environmentally controlled facility may be indicated on the heatmap 500, such as a server rack 502. Environmental control equipment such as ductwork and fan placement may also be indicated on the heatmap 500. The heatmap 500 may be in grayscale as shown, with areas corresponding to a relatively high sensed parameter appearing differently than a relatively low sensed parameter. For example, a region 504 that is shown to be lighter than a region 506 may be relatively hotter than the region 506 in various embodiments. In embodiments, a heatmap using grayscale may allow a range of magnitudes of sensor data values to be shown differently such that the sensor data may have a dynamic range with varying values of a changeable quantity measured by one or more sensors shown differently across the range, that may include the largest and smallest possible values of the changeable quantity that may be measured by the one or more sensors. For example, the grayscale values may correspond to temperature values of −10 degrees Celsius to 150 degrees Celsius for sensors with the ability to measure as low as −10 degrees Celsius and as high as 150 degrees Celsius. In embodiments, a subset of the possible values that may be measured by the one or more sensors rather than all possible values that may be measured by the one or more sensors may be represented by the heatmap. For example, the grayscale values may correspond to temperature values of 5 degrees Celsius to 90 degrees Celsius for sensors with the ability to measure as low as −10 degrees Celsius and as high as 150 degrees Celsius because the values at the lowest and highest sensing capability of the sensors are not of interest for the particular application. In embodiments, a legend may also be displayed that shows values of the sensed parameter and their corresponding grayscale or color value. In embodiments, sensed parameters may be shown with various colors corresponding to different magnitudes of the sensed parameter. A building or infrastructure manager may be able to identify potential areas of concern and form a plan of action if needed based at least in part on the heatmap.

Figure 6:
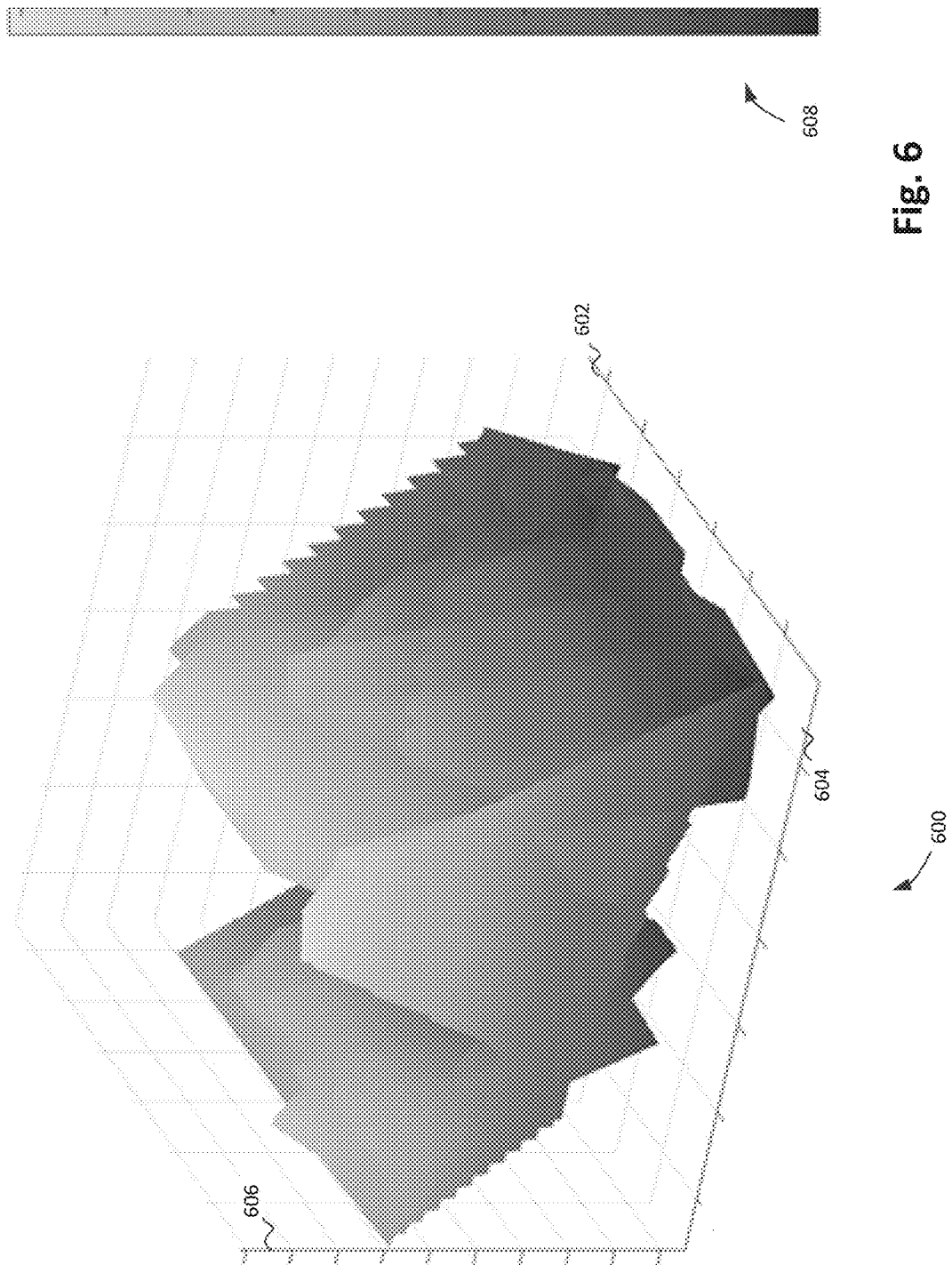
FIG. 6 illustrates an example temperature survey heatmap showing a height dimension, in accordance with various embodiments.

FIG. 6 illustrates an example three-dimensional (3D) temperature survey heatmap 600 showing a height dimension, in accordance with various embodiments. The heatmap 600 may be generated by the computing device 102 as described with respect to the block 216 of FIG. 2 or the block 426 of FIG. 4 in various embodiments, for example. In embodiments, the heatmap 600 may include a relative X dimension 602, a relative Y dimension 604, and a relative Z dimension 606. The relative X dimension 602 and the relative Y dimension 604 may correspond to coordinate axes of a two dimensional floorplan, in embodiments. The relative Z dimension may correspond to a magnitude of a sensed parameter in various embodiments. For example, the plot may rise along the relative Z dimension with increasing temperature, for example. A legend 608 may also be displayed when the heatmap 600 is generated that may show grayscale or color values corresponding to various magnitudes of the sensed parameter. In embodiments, the heatmap 600 may be displayed as a mesh or surface without variation in color or tone. In other embodiments, grayscale or color may be used that correspond with the magnitude of the sensed parameter shown on the relative Z dimension 606. In other embodiments, the grayscale or color value may correspond to a different sensed parameter than the sensed parameter corresponding to the relative Z dimension 606. For example, in embodiments, the relative Z dimension 606 and the legend 608 may both correspond to temperature or humidity, while in other embodiments, one of them may correspond to temperature and the other to humidity.

Figure 7:
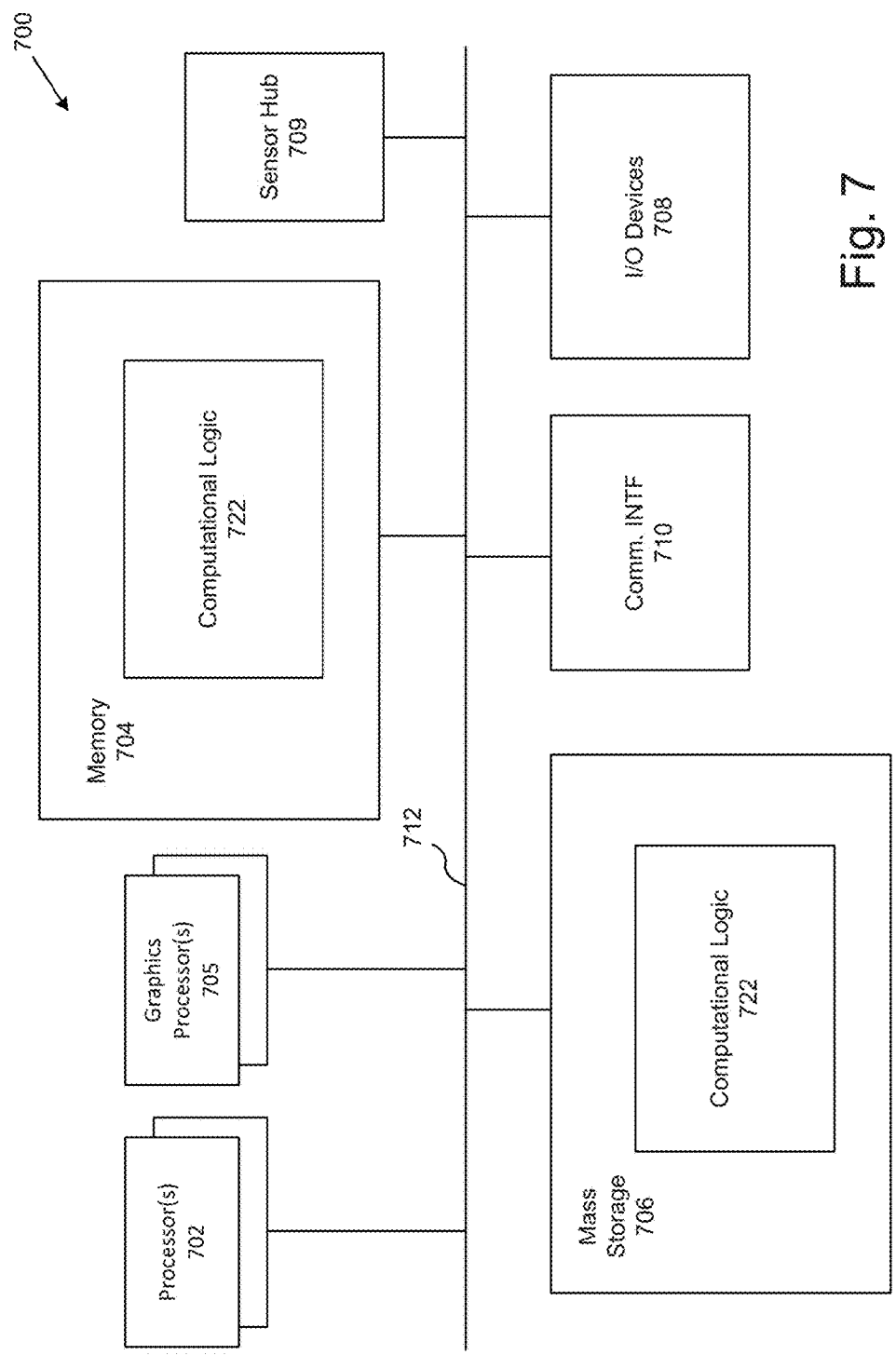
FIG. 7 illustrates an example computing environment suitable for practicing various aspects of the disclosure, in accordance with various embodiments.

Referring now to FIG. 7, an example computer 700 suitable to practice the present disclosure as earlier described with reference to FIGS. 1-4 is illustrated in accordance with various embodiments. As shown, computer 700 may include one or more processors or processor cores 702, and system memory 704. For the purpose of this application, including the claims, the terms "processor" and "processor cores" may be considered synonymous, unless the context clearly requires otherwise. Additionally, computer 700 may include one or more graphics processors 705, mass storage devices 706 (such as diskette, hard drive, compact disc read only memory (CD-ROM) and so forth), input/output devices 708 (such as display, keyboard, cursor control, remote control, gaming controller, image capture device, and so forth), sensor hub 709, and communication interfaces 710 (such as network interface cards, modems, infrared receivers, radio receivers (e.g., Bluetooth), and so forth). The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage devices 706 may be employed to store a working copy and a permanent copy of the programming instructions implementing the operations associated with the computing device 102, e.g., operations described for wireless network coordination module 122, sensor information database 124, sensor data module 126, interpolation module 128, image generation module 130, alert module 132, and other modules 138, shown in FIG. 1, or operations shown in process 200 of FIG. 2, process 300 of FIG. 3, or process 400 of FIG. 4 collectively denoted as computational logic 722. The system memory 704 and mass storage devices 706 may also be employed to store a working copy and a permanent copy of the programming instructions implementing the operations associated with an OS running on the computing device 102. The system memory 704 and mass storage devices 706 may also be employed to store the data or local resources in various embodiments. The various elements may be implemented by assembler instructions supported by processor(s) 702 or high-level languages, such as, for example, C, that can be compiled into such instructions.

The permanent copy of the programming instructions may be placed into mass storage devices 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices.

The number, capability and/or capacity of these elements 702-722 may vary, depending on whether computer 700 is a stationary computing device, such as a server, high performance computing node, set-top box or desktop computer, a mobile computing device such as a tablet computing device, laptop computer or smartphone, or an embedded computing device. Their constitutions are otherwise known, and accordingly will not be further described. In various embodiments, different elements or a subset of the elements shown in FIG. 7 may be used. For example, some devices may not include the graphics processor 705, may use a unified memory that serves as both memory and storage, or may couple sensors without using a sensor hub.

Figure 8:
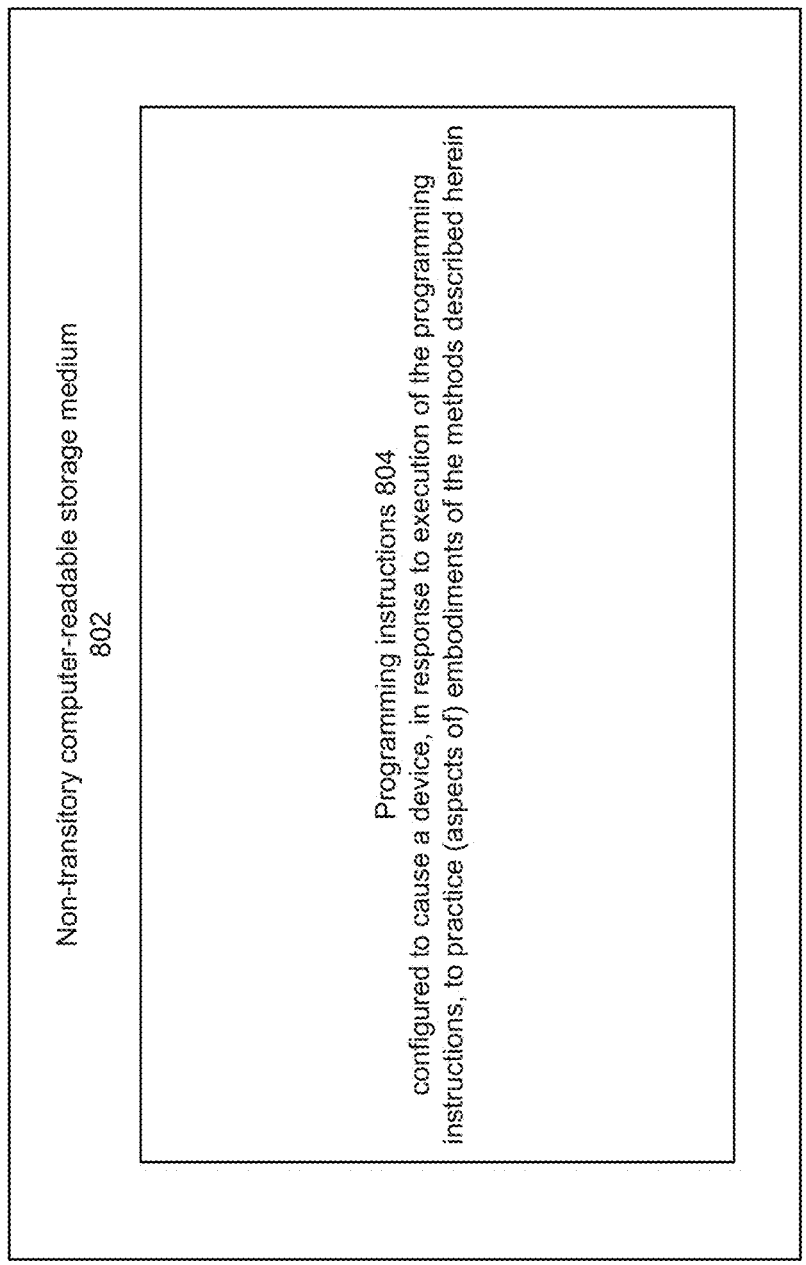
FIG. 8 illustrates an example storage medium with instructions configured to enable an apparatus to practice various aspects of the present disclosure, in accordance with various embodiments.

FIG. 8 illustrates an example at least one non-transitory computer-readable storage medium 802 having instructions configured to practice all or selected ones of the operations associated with the computing device 102, earlier described, in accordance with various embodiments. As illustrated, at least one non-transitory computer-readable storage medium 802 may include a number of programming instructions 804. The storage medium 802 may represent a broad range of persistent storage medium known in the art, including but not limited to flash memory, dynamic random access memory, static random access memory, an optical disk, a magnetic disk, etc. Programming instructions 804 may be configured to enable a device, e.g., computer 700 or computing device 102, in response to execution of the programming instructions 804, to perform, e.g., but not limited to, various operations described for wireless network coordination module 122, sensor information database 124, sensor data module 126, interpolation module 128, image generation module 130, alert module 132, and other modules 138, shown in FIG. 1, or operations shown in process 200 of FIG. 2, process 300 of FIG. 3, or process 400 of FIG. 4. In alternate embodiments, programming instructions 804 may be disposed on multiple computer-readable storage media 802. In alternate embodiment, storage medium 802 may be transitory, e.g., signals encoded with programming instructions 804.

Referring back to FIG. 7, for an embodiment, at least one of processors 702 may be packaged together with memory having computational logic 722 configured to practice aspects described for wireless network coordination module 122, sensor information database 124, sensor data module 126, interpolation module 128, image generation module 130, alert module 132, and other modules 138, shown in FIG. 1, or operations shown in process 200 of FIG. 2, process 300 of FIG. 3, or process 400 of FIG. 4. For an embodiment, at least one of processors 702 may be packaged together with memory having computational logic 722 configured to practice aspects described for wireless network coordination module 122, sensor information database 124, sensor data module 126, interpolation module 128, image generation module 130, alert module 132, and other modules 138, shown in FIG. 1, or operations shown in process 200 of FIG. 2, process 300 of FIG. 3, or process 400 of FIG. 4 to form a System in Package (SiP). For an embodiment, at least one of processors 702 may be integrated on the same die with memory having computational logic 722 configured to practice aspects described for wireless network coordination module 122, sensor information database 124, sensor data module 126, interpolation module 128, image generation module 130, alert module 132, and other modules 138, shown in FIG. 1, or operations shown in process 200 of FIG. 2, process 300 of FIG. 3, or process 400 of FIG. 4. For an embodiment, at least one of processors 702 may be packaged together with memory having computational logic 722 configured to practice aspects of wireless network coordination module 122, sensor information database 124, sensor data module 126, interpolation module 128, image generation module 130, alert module 132, and other modules 138, shown in FIG. 1, or operations shown in process 200 of FIG. 2, process 300 of FIG. 3, or process 400 of FIG. 4 to form a System on Chip (SoC). For at least one embodiment, the SoC may be utilized in, e.g., but not limited to, a mobile computing device such as a wearable device and/or a smartphone.

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 may include a computing apparatus for visualizing sensor data comprising: one or more processors; a sensor data receiving module operated by the one or more processors to receive a plurality of sensor data values and a plurality of location data values corresponding to the plurality of sensor data values; an interpolation module operated by the one or more processors to: generate interpolated data values for a surveyed area based at least in part on the plurality of sensor data values and the plurality of location data values; and an image generator operated by the one or more processors to generate an image corresponding to the surveyed area based at least in part on the plurality of sensor data values and the interpolated data values.

Example 2 may include the subject matter of Example 1, wherein the sensor data receiving module is to: receive a first sensor data value from a first sensor; receive a first location data value from the first sensor corresponding to the first sensor data value; receive a second sensor data value from the first sensor; and receive a second location data value from the first sensor corresponding to the second sensor data value, wherein the second location data value is different than the first location data value.

Example 3 may include the subject matter of any one of Examples 1-2, wherein the image generator is to depict the interpolated data values such that a first interpolated data value lower than a second interpolated data value is assigned a color closer to a first end of a color spectrum than the second interpolated data value.

Example 4 may include the subject matter of any one of Examples 1-3, wherein the sensor data receiving module is to receive a plurality of sensor identifiers, wherein each sensor data value in the plurality of sensor data values corresponds to a particular sensor identifier in the plurality of sensor identifiers, and wherein the interpolation module is to: determine whether any of the plurality of sensor data values are outside of a predetermined range; and determine a set of excluded sensor identifiers corresponding to sensor data values determined to be outside the predetermined range, wherein the interpolation module is to exclude all sensor data values corresponding to the set of excluded sensor identifiers.

Example 5 may include the subject matter of any one of Examples 1-4, wherein the image is a three dimensional image with height values corresponding to sensor data values and interpolated data values.

Example 6 may include the subject matter of any one of Examples 1-5, wherein the image generator is to align the generated image with a map of the surveyed area and display the generated image over the map of the surveyed area, wherein the sensor data values correspond to sensed temperatures.

Example 7 may include the subject matter of any one of Examples 1-6, wherein the image generator is to determine which sensor data values and interpolated data values are above a predetermined threshold, and wherein the image generator is to generate the image based at least in part on the sensor data values and interpolated data values determined to be above the predetermined threshold.

Example 8 may include the subject matter of any one of Examples 1-7, wherein the plurality of sensor data values is a first plurality of sensor data values, wherein the plurality of location data values is a first plurality of location data values, wherein the sensor data receiving module is to: receive a second plurality of sensor data values; and receive a second plurality of location data values corresponding to the second plurality of sensor data values, the computing apparatus further comprising: an alert module operated by the one or more processors to: determine a plurality of rate of change values and a corresponding plurality of rate of change location values based at least in part on the first plurality of sensor data values, the first plurality of location data values, the second plurality of sensor data values, and the second plurality of location data values; and send an alert message based at least in part on a rate of change value in the plurality of rate of change values determined to be above a predetermined notification level, wherein the alert message includes an alert location corresponding to the rate of change value determined to be above the predetermined notification level.

Example 9 may include a computer implemented method comprising: receiving, by a computing device, a plurality of sensor data values; receiving, by the computing device, a plurality of location data values corresponding to the plurality of sensor data values; generating, by the computing device, interpolated data values for a surveyed area based at least in part on the plurality of sensor data values and the plurality of location data values; and generating, by the computing device, an image corresponding to the surveyed area based at least in part on the sensor data values and the interpolated data values.

Example 10 may include the subject matter of Example 9, wherein receiving, by the computing device, the plurality of sensor data values includes receiving a first sensor data value from a first sensor and a second sensor data value from the first sensor, wherein receiving, by the computing device, the plurality of location data values includes receiving a first location data value from the first sensor corresponding to the first sensor data value and a second location data value from the first sensor corresponding to the second sensor data value, wherein the second location data value is different than the first location data value.

Example 11 may include the subject matter of any one of Examples 9-10, wherein generating an image includes depicting the interpolated data values using color such that a first interpolated data value lower than a second interpolated data value is assigned a color closer to a first end of a color spectrum than the second interpolated data value.

Example 12 may include the subject matter of any one of Examples 9-11, further comprising: receiving, by the computing device, a plurality of sensor identifiers, wherein each sensor data value in the plurality of sensor data values corresponds to a particular sensor identifier in the plurality of sensor identifiers; determining, by the computing device, whether any of the plurality of sensor data values are outside of a predetermined range; and determining, by the computing device, a set of excluded sensor identifiers corresponding to sensor data values determined to be outside of the predetermined range, wherein generating the interpolated data values includes excluding all sensor data values corresponding to the set of excluded sensor identifiers.

Example 13 may include the subject matter of any one of Examples 9-12, wherein the image is a three dimensional image with height values corresponding to sensor data values and interpolated data values.

Example 14 may include the subject matter of any one of Examples 9-13, further comprising: aligning, by the computing device, the generated image with a map of the surveyed area; and displaying, by the computing device, the generated image overlaid on the map of the surveyed area, wherein the sensor data values correspond to sensed temperatures.

Example 15 may include the subject matter of any one of Examples 9-14, further comprising determining which sensor data values and interpolated data values are above a predetermined threshold, wherein generating the image is based at least in part on the sensor data values and interpolated data values determined to be above the predetermined threshold.

Example 16 may include the subject matter of any one of Examples 9-15, wherein the plurality of sensor data values is a first plurality of sensor data values and wherein the plurality of location data values is a first plurality of location data values, the method further comprising: receiving, by the computing device, a second plurality of sensor data values; receiving, by the computing device, a second plurality of location data values corresponding to the second plurality of sensor data values; determining, by the computing device, a plurality of rate of change values and a corresponding plurality of rate of change location values based at least in part on the first plurality of sensor data values, the first plurality of location data values, the second plurality of sensor data values, and the second plurality of location data values; and sending, by the computing device, an alert message based at least in part on a rate of change value in the plurality of rate of change values determined to be above a predetermined notification level, wherein the alert message includes an alert location corresponding to the rate of change value determined to be above the predetermined notification level.

Example 17 may include at least one non-transitory computer-readable medium comprising instructions stored thereon that, in response to execution of the instructions by a computing device, cause the computing device to: receive a plurality of sensor data values; receive a plurality of location data values corresponding to the plurality of sensor data values; generate interpolated data values for a surveyed area based at least in part on the plurality of sensor data values and the plurality of location data values; and generate an image corresponding to the surveyed area based at least in part on the sensor data values and the interpolated data values.

Example 18 may include the subject matter of Example 17, wherein the computing device is caused to: receive a first sensor data value from a first sensor and a second sensor data value from the first sensor; and receive a first location data value from the first sensor corresponding to the first sensor data value and a second location data value from the first sensor corresponding to the second sensor data value, wherein the second location data value is different than the first location data value.

Example 19 may include the subject matter of any one of Examples 17-18 wherein the computing device is further caused to depict the interpolated data values using color such that a first interpolated data value lower than a second interpolated data value is assigned a color closer to a first end of a color spectrum than the second interpolated data value.

Example 20 may include the subject matter of any one of Examples 17-19, wherein the computing device is further caused to: receive a plurality of sensor identifiers, wherein each sensor data value in the plurality of sensor data values corresponds to a particular sensor identifier in the plurality of sensor identifiers; determine whether any of the plurality of sensor data values are outside of a predetermined range; and determine a set of excluded sensor identifiers corresponding to sensor data values determined to be outside of the predetermined range, wherein the computing device is caused to exclude all sensor data values corresponding to the set of excluded sensor identifiers.

Example 21 may include the subject matter of any one of Examples 17-20 wherein the computing device is caused to generate a three dimensional image with height values that correspond to sensor data values and interpolated data values.

Example 22 may include the subject matter of any one of Examples 17-21, wherein the computing device is further caused to: align the generated image with a map of the surveyed area; and display the generated image overlaid on the map of the surveyed area, wherein the sensor data values correspond to sensed temperatures.

Example 23 may include the subject matter of any one of Examples 17-22 wherein the computing device is further caused to determine which sensor data values and interpolated data values are above a predetermined threshold, wherein the computing device is caused to generate the image based at least in part on the sensor data values and interpolated data values determined to be above the predetermined threshold.

Example 24 may include the subject matter of any one of Examples 17-23 wherein the plurality of sensor data values is a first plurality of sensor data values, wherein the plurality of location data values is a first plurality of location data values, and wherein the computing device is further caused to: receive a second plurality of sensor data values; receive a second plurality of location data values corresponding to the second plurality of sensor data values; determine a plurality of rate of change values and a corresponding plurality of rate of change location values based at least in part on the first plurality of sensor data values, the first plurality of location data values, the second plurality of sensor data values, and the second plurality of location data values; and send an alert message based at least in part on a rate of change value in the plurality of rate of change values determined to be above a predetermined notification level, wherein the alert message includes an alert location corresponding to the rate of change value determined to be above the predetermined notification level.

Example 25 may include an apparatus for computing, comprising: means for receiving a plurality of sensor data values; means for receiving a plurality of location data values corresponding to the plurality of sensor data values; means for generating interpolated data values for a surveyed area based at least in part on the plurality of sensor data values and the plurality of location data values; and means for generating an image corresponding to the surveyed area based at least in part on the sensor data values and the interpolated data values.

Example 26 may include the subject matter of Example 25, wherein the means for receiving the plurality of sensor data values includes means for receiving a first sensor data value from a first sensor and a second sensor data value from the first sensor, wherein the means for receiving the plurality of location data values includes means for receiving a first location data value from the first sensor corresponding to the first sensor data value and a second location data value from the first sensor corresponding to the second sensor data value, wherein the second location data value is different than the first location data value.

Example 27 may include the subject matter of any one of Examples 25-26, wherein the means for generating an image includes means for depicting the interpolated data values using color such that a first interpolated data value lower than a second interpolated data value is assigned a color closer to a first end of a color spectrum than the second interpolated data value.

Example 28 may include the subject matter of any one of Examples 25-27, further comprising: means for receiving a plurality of sensor identifiers, wherein each sensor data value in the plurality of sensor data values corresponds to a particular sensor identifier in the plurality of sensor identifiers; means for determining whether any of the plurality of sensor data values are outside of a predetermined range; and means for determining a set of excluded sensor identifiers corresponding to sensor data values determined to be outside of the predetermined range, wherein the means for generating the interpolated data values includes means for excluding all sensor data values corresponding to the set of excluded sensor identifiers.

Example 29 may include the subject matter of any one of Examples 25-28, wherein the image is a three dimensional image with height values corresponding to sensor data values and interpolated data values.

Example 30 may include the subject matter of any one of Examples 25-29, further comprising: means for aligning the generated image with a map of the surveyed area; and means for displaying the generated image overlaid on the map of the surveyed area, wherein the sensor data values correspond to sensed temperatures.

Example 31 may include the subject matter of any one of Examples 25-30, further comprising means for determining which sensor data values and interpolated data values are above a predetermined threshold, wherein the means for generating the image is to generate the image based at least in part on the sensor data values and interpolated data values determined to be above the predetermined threshold.

Example 32 may include the subject matter of any one of Examples 25-31, wherein the plurality of sensor data values is a first plurality of sensor data values and wherein the plurality of location data values is a first plurality of location data values, the method further comprising: means for receiving a second plurality of sensor data values; means for receiving a second plurality of location data values corresponding to the second plurality of sensor data values; means for determining a plurality of rate of change values and a corresponding plurality of rate of change location values based at least in part on the first plurality of sensor data values, the first plurality of location data values, the second plurality of sensor data values, and the second plurality of location data values; and means for sending an alert message based at least in part on a rate of change value in the plurality of rate of change values determined to be above a predetermined notification level, wherein the alert message includes an alert location corresponding to the rate of change value determined to be above the predetermined notification level.

Example 33 may include a computing apparatus comprising: one or more processors; a sensor data receiving module operated by the one or more processors to receive a plurality of sensor data values and a plurality of location data values corresponding to the plurality of sensor data values; and an action module operated by the one or more processors to generate an action based at least in part on the plurality of sensor data values and the plurality of location data values.

Example 34 may include the subject matter of Example 33, wherein the plurality of sensor data values is a first plurality of sensor data values, wherein the plurality of location data values is a first plurality of location data values, wherein the sensor data receiving module is to: receive a second plurality of sensor data values; and receive a second plurality of location data values corresponding to the second plurality of sensor data values, wherein the action module is to: determine a plurality of rate of change values and a corresponding plurality of rate of change location values based at least in part on the first plurality of sensor data values, the first plurality of location data values, the second plurality of sensor data values, and the second plurality of location data values; and generate the action based at least in part on a rate of change value in the plurality of rate of change values and a corresponding rate of change location value.

Example 35 may include the subject matter of any one of Examples 33-34, further comprising a threshold comparison module operated by the one or more processors to compare the sensor data values to a predefined threshold value, wherein the action module is to generate the action based at least in part on the comparison of the sensor data values to the predefined threshold value.

Example 36 may include the subject matter of Example 35, further comprising: an interpolation module operated by the one or more processors to generate interpolated data values for a surveyed area based at least in part on the plurality of sensor data values and the plurality of location data values, wherein the threshold comparison module is to compare the interpolated data values to the predefined threshold value, and wherein the action module is to generate the action based at least in part on the interpolated data values.

Example 37 may include the subject matter of any one of Examples 33-36, wherein the action module includes an image generator to generate an image.

Example 38 may include the subject matter of any one of Examples 33-36, wherein the action module includes an alert module to send an alert message.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A system for managing one or more environmental conditions of an area, including collection of sensor data and their visualization, comprising:
 a plurality of wireless sensors deployed simultaneously or successively at a first plurality of locations in the area, to form a mesh network of wireless sensors, to collect sensor data associated with the one or more environmental conditions at the first plurality of locations, and to wirelessly and cooperatively report the collected sensor data via the mesh network; and
 a base station located at the area, to act as a network coordinator of the mesh network, the base station including:
  one or more processors;
  a wireless receiver arranged to receive signals from the wireless sensors;
  a wireless network coordination module arranged to be operated by the one or more processors to coordinate operation of the mesh network;
  a network interface card arranged to communicatively couple the base station to a wide area network;
  a sensor data receiving module arranged to be operated by the one or more processors to receive a plurality of sensor data values of the collected sensor data, and a plurality of location data values corresponding to the plurality of sensor data values and the first plurality of locations where the plurality of sensor data values are collected;
  an interpolation module arranged to be operated by the one or more processors to: generate interpolated data values for a second plurality of locations of the area in a two dimensional plane based at least in part on the plurality of sensor data values and the plurality of location data values for the first plurality of locations; and
  an image generator arranged to be operated by the one or more processors to:
   generate a three dimensional (3D) surface plot including the two dimensional plane and a third dimension based on a magnitude of the plurality of sensor data values and the interpolated data values, and
   generate a 3D image of the area with visual depictions of the one or more environmental conditions with height values corresponding to the magnitude of the plurality of sensor data values and the interpolated data values.

2. The system of claim 1, wherein the plurality of sensors comprises at least a first sensor that is portable and deployed successively at least a first location and a second location of the first plurality of locations, the first and second locations being different locations, and wherein the sensor data receiving module is arranged to:
 receive a first sensor data value from the first sensor;
 receive a first location data value from the first sensor corresponding to the first sensor data value and the first location of the first plurality of locations;
 receive a second sensor data value from the first sensor; and
 receive a second location data value from the first sensor corresponding to the second sensor data value and the second location of the first plurality of locations, the second location data value being different from the first location data value.

3. The system of claim 1, wherein the image generator is arranged to depict the interpolated data values such that a first interpolated data value lower than a second interpolated data value is assigned a color closer to a first end of a color spectrum than the second interpolated data value.

4. The system of claim 1, wherein:
 the sensor data receiving module is arranged to receive a plurality of sensor identifiers from the plurality of sensors, wherein each sensor data value in the plurality of sensor data values corresponds to a particular sensor identifier in the plurality of sensor identifiers;
 the interpolation module is arranged to:
  determine whether any of the plurality of sensor data values are outside of a predetermined range,
  determine a set of excluded sensor identifiers corresponding to sensor data values determined to be outside the predetermined range, and
  exclude all sensor data values corresponding to the set of excluded sensor identifiers.

5. The system of claim 1, wherein the image generator is arranged to align the generated image with a map of the area and display the generated image over the map of the area, wherein the sensor data values correspond to sensed temperatures at the first plurality of locations of the area.

6. The system of claim 1, wherein the plurality of sensor data values is a first plurality of sensor data values, wherein the plurality of location data values is a first plurality of location data values, wherein the sensor data receiving module is arranged to:
 receive a second plurality of sensor data values; and
 receive a second plurality of location data values corresponding to the second plurality of sensor data values and the first plurality of locations of the area, and wherein the base station further comprises:
 an alert module operated by the one or more processors to:
  determine a plurality of rate of change values for the first plurality of locations, based at least in part on the first plurality of sensor data values and the second plurality of sensor data values; and
  send an alert message based at least in part on a rate of change value in the plurality of rate of change values determined to be above or below a predetermined notification level, wherein the alert message includes an alert location corresponding to the location where the rate of change value is determined to be above or below the predetermined notification level.

7. The system of claim 6, wherein the alert message includes a recommendation to alter an activation state of an environmental control device.

8. The system of claim 6, wherein the alert message includes a recommendation to alter a location of an environmental control device.

9. The system of claim 1, further comprising a sensor information database, wherein one or more of the one or more processors are to generate one or more corrected sensor data values based at least in part on an offset to one or more of the plurality of sensor data values and one or more sensor device identifiers, wherein the interpolation module is to generate the interpolated data values based at least in part on the one or more corrected sensor data values.

10. The system of claim 1, wherein at least one or more of the plurality of sensors are Internet-of-Things (IoT) sensors.

11. A computer assisted method for managing one or more environmental conditions of an area, comprising:

deploying a plurality of wireless sensors simultaneously or successively at a first plurality of locations in the area, to form a mesh network, to collect sensor data associated with the one or more environmental conditions at the first plurality of locations, and to wirelessly and cooperatively report the collected sensor data via the mesh network;

receiving, by a base station of the mesh network responsible for controlling operation of the mesh network, a plurality of sensor data values of the collected sensor data, wherein the plurality of sensor data values are based at least in part on wireless signals received at a wireless receiver of the base station from the wireless sensors, the base station also coupling the mesh network to a wide area network;

receiving, by the base station, a plurality of location data values corresponding to the plurality of sensor data values and the first plurality of locations;

generating, by the base station, interpolated data values for a second plurality of locations of the area in a two-dimensional plane based at least in part on the plurality of sensor data values and the plurality of location data values of the first plurality of locations;

generating, by the base station, a three dimensional (3D) surface plot including the two dimensional plane and a third dimension based on a magnitude of the plurality of sensor data values and interpolated data values; and generating, by the base station, a 3D image of the area with visual depictions of the one or more environmental conditions with height values corresponding to the magnitude of the plurality of sensor data values and the interpolated data values.

12. The method of claim 11, wherein deploying comprises deploying at least a first of the plurality of wireless sensors first at a first location of the first plurality of locations, and subsequently at a second location of the location of the first plurality of locations, the first and second locations being different locations; and wherein receiving the plurality of sensor data values includes receiving, by the base station, a first sensor data value from the first sensor and a second sensor data value from the first sensor, wherein receiving the plurality of location data values includes receiving, by the base station, a first location data value from the first sensor corresponding to the first sensor data value and first location, and a second location data value from the first sensor corresponding to the second sensor data value and the second location.

13. The method of claim 11, wherein generating an image includes depicting the interpolated data values using color such that a first interpolated data value lower than a second interpolated data value is assigned a color closer to a first end of a color spectrum than the second interpolated data value.

14. The method of claim 11, further comprising:

receiving, by the base station, a plurality of sensor identifiers of the plurality of wireless sensors, wherein each sensor data value in the plurality of sensor data values corresponds to a particular sensor identifier in the plurality of sensor identifiers;

determining, by the base station, whether any of the plurality of sensor data values are outside of a predetermined range; and determining, by the base station, a set of excluded sensor identifiers corresponding to sensor data values determined to be outside of the predetermined range, wherein generating the interpolated data values includes excluding all sensor data values corresponding to the set of excluded sensor identifiers.

15. The method of claim 11, further comprising:

aligning, by the base station, the generated image with a map of the area; and displaying, by the base station, the generated image overlaid on the map of the area.

16. The method of claim 11, wherein the plurality of sensor data values is a first plurality of sensor data values and wherein the plurality of location data values is a first plurality of location data values, the method further comprising:

receiving, by the base station, a second plurality of sensor data values;

receiving, by the base station, a second plurality of location data values corresponding to the second plurality of sensor data values and the first plurality of locations;

determining, by the base station, a plurality of rate of change values based at least in part on the first plurality of sensor data values, and the second plurality of sensor data values; and sending, by the base station, an alert message based at least in part on a rate of change value in the plurality of rate of change values determined to be above or below a predetermined notification level.

17. At least one non-transitory computer-readable medium comprising instructions stored thereon, wherein execution of the instructions by a base station of a mesh network having a plurality of wireless sensors is to cause the base station to:

receive a first plurality of sensor data values from the plurality of wireless sensors;

receive a first plurality of location data values corresponding to the first plurality of sensor data values and a first plurality of locations of an area, the plurality of wireless sensors being simultaneously or successively deployed at the first plurality of locations;

receive a second plurality of sensor data values that are interpolated from the first plurality of sensor data values;

receive a second plurality of location data values corresponding to the second plurality of sensor data values and the first plurality of locations;

generate a three dimensional (3D) image of the area with visual depictions of one or more environmental conditions, wherein the 3D image is based on a 3D surface plot including a two dimensional plane and a third dimension, wherein the two dimensional plane is based on the first plurality of sensor data values at the first plurality of location data values and the second plurality of sensor data values at the second plurality of location data values, and the third dimension is based on a magnitude of the first plurality of sensor data values and the second plurality of sensor data values;

determine a plurality of rate of change values and a corresponding plurality of rate of change location values for the first and second plurality of locations, based at least in part on the first plurality of sensor data values and the second plurality of sensor data values; and send an alert message based at least in part on a rate of change value in the plurality of rate of change values determined to be above or below a predetermined notification level;

wherein the base station also couples the mesh network to a wide area network.

18. The at least one non-transitory computer-readable medium of claim 17, wherein execution of the instructions is to cause the base station to:
  receive a first sensor data value from a first of the plurality of sensors and a second sensor data value from the first sensor; and
  receive a first location data value from the first sensor corresponding to the first sensor data value and a first location of the first plurality of locations, and a second location data value from the first sensor corresponding to the second sensor data value and a second location of the first plurality of locations, wherein the second location data value is different than the first location data value, the first sensor being first deployed at the first location, and subsequently deployed at the second location.

19. The at least one non-transitory computer-readable medium of claim 17, wherein execution of the instructions is to cause the base station to:
  receive a plurality of sensor identifiers, wherein each sensor data value in the first plurality of sensor data values corresponds to a particular sensor identifier in the plurality of sensor identifiers;
  determine whether any of the first plurality of sensor data values are outside of a predetermined range;
  determine a set of excluded sensor identifiers corresponding to sensor data values determined to be outside of the predetermined range; and
  exclude all sensor data values corresponding to the set of excluded sensor identifiers.

20. The at least one non-transitory computer-readable medium of claim 17, wherein execution of the instructions is to cause the base station to:
  align the generated image with a map of the area; and
  display the generated image overlaid on the map of the area.

21. The at least one non-transitory computer-readable medium of claim 17 wherein execution of the instructions is to cause the base station to:
  determine which sensor data values are above or below a predetermined threshold; and
  generate the image based at least in part on the sensor data values determined to be above or below the predetermined threshold.

* * * * *